(12) United States Patent
Hethcock et al.

(10) Patent No.: US 9,364,930 B2
(45) Date of Patent: Jun. 14, 2016

(54) METHOD OF MACHINING A THIN-WALLED STRUCTURE

(71) Applicant: Bell Helicopter Textron Inc., Fort Worth, TX (US)

(72) Inventors: J. Donn Hethcock, Colleyville, TX (US); Scott Wolthuis, Weatherford, TX (US); Robert Brack, Bedford, TX (US); Paul Oldroyd, Azle, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 318 days.

(21) Appl. No.: 13/802,357

(22) Filed: Mar. 13, 2013

(65) Prior Publication Data

US 2014/0259628 A1 Sep. 18, 2014

(51) Int. Cl.
| | |
|---|---|
| *B23P 25/00* | (2006.01) |
| *B23Q 3/06* | (2006.01) |
| *B23Q 3/08* | (2006.01) |
| *B26F 3/00* | (2006.01) |
| *B23K 10/00* | (2006.01) |

(Continued)

(52) U.S. Cl.
CPC ............ *B23P 25/00* (2013.01); *B23K 10/00* (2013.01); *B23K 26/38* (2013.01); *B23Q 3/065* (2013.01); *B23Q 3/086* (2013.01); *B26F 3/004* (2013.01); *B23C 3/16* (2013.01); *B23C 2228/25* (2013.01); *B23K 2201/02* (2013.01); *Y10T 29/49995* (2015.01); *Y10T 29/49998* (2015.01)

(58) Field of Classification Search
CPC ............ B23P 25/00; B23Q 3/02; B23Q 3/06; B23Q 3/062; B23Q 3/065; B23Q 3/086; B23Q 3/15; B23C 3/16; B23C 2228/25; Y10T 29/49995; Y10T 29/49998

USPC ............................. 29/423, 424; 269/7, 8, 47
See application file for complete search history.

(56) References Cited

U.S. PATENT DOCUMENTS 2,855,664 A * 10/1958 Griffith et al. ................. 29/424
2,905,064 A *  9/1959 Nielsen ............................ 269/7
3,064,345 A * 11/1962 Herman et al. ................ 29/423

(Continued)

FOREIGN PATENT DOCUMENTS

EP 0119437 A2 9/1984
GB 2372477 8/2008

OTHER PUBLICATIONS

Communication from a Counter-Part Application; European Invitation Pursuant to Rule 62a(1) EPC; European Application No. EP 13169016.6; Oct. 16, 2013; 2 pgs.
Extended European Search Report issued in European Application No. 13169016.6 on Apr. 14, 2014; 5 pages.
Witte, "ICE-VICE Freeze Clamp Technology," 8 pages.

(Continued)

*Primary Examiner* — Christopher M Koehler
(74) *Attorney, Agent, or Firm* — Fish & Richardson P.C.

(57) ABSTRACT

A method of manipulating a thin-walled structure includes providing a thin-walled structure in a first unconstrained configuration, constraining the thin-walled structure to a first constrained configuration in which a first feature of the thin-walled structure is spatially located relative to the a second feature of the thin-walled structure in a predetermined manner, wherein an open volume of the thin-walled structure is constrained to maintain a predetermined open volume shape, and machining the thin-walled structure to a second constrained configuration in which the first feature of the thin-walled structure remains spatially located relative to the second feature of the thin-walled structure in the predetermined manner.

26 Claims, 9 Drawing Sheets

(51) Int. Cl.
 *B23K 26/38* (2014.01)
 *B23C 3/16* (2006.01)

(56) References Cited

U.S. PATENT DOCUMENTS

| | | | | |
|---|---|---|---|---|
| 3,140,958 | A | * | 7/1964 | Opotow ............ H02G 3/086 174/66 |
| 3,176,387 | A | * | 4/1965 | Argueso, Jr. et al. ........... 29/423 |
| 3,791,970 | A | * | 2/1974 | Tubb ................................ 8/433 |
| 4,013,210 | A | | 3/1977 | Deminet |
| 5,131,637 | A | | 7/1992 | Vaught |

OTHER PUBLICATIONS

Witte, "ICEVICE Freeze Clamp Technology," 9 pages.
MM Technology Update, "Holding on to the Unusual," Nov. 2008, 3 pages.
Communication pursuant to Article 94(3) issued in EP Application No. 13169016.6 on Jan. 26, 2015, 4 pages.
Office Action issued in Canadian Application No. 2,846,010 on Nov. 3, 2015; 3 pages.
Communication under Rule 71(3) EPC issued in European Application No. 13169016.6 on Jan. 11, 2016; 38 pages.

* cited by examiner

METHOD OF MACHINING A THIN-WALLED STRUCTURE

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Machining thin-walled structures, such as honeycomb structures, sometimes requires a costly and time consuming process comprising temporarily affixing a skin to the thin-walled structure. In some cases, the skin may hold the thin-walled structure in a fixed configuration while also providing a surface that may be held by a suction table. Accordingly, the skin may allow the thin-walled structure to be spatially restrained during a machining process. In some cases, the skin may need to be removed after the machining process. Still further, in cases where a profile of the thin-walled structure that was previously attached to the skin may need to be machined, the already machined profile of the thin-walled structure may require an expensive special purpose complementary tool for receiving the machined profile of the thin-walled structure while the opposing profile is machined.

SUMMARY

In some embodiments of the disclosure, method of manipulating a thin-walled structure is disclosed as comprising providing a thin-walled structure in a first unconstrained configuration, constraining the thin-walled structure to a first constrained configuration in which a first feature of the thin-walled structure is spatially located relative to the a second feature of the thin-walled structure in a predetermined manner, wherein an open volume of the thin-walled structure is constrained to maintain a predetermined open volume shape, and machining the thin-walled structure to a second constrained configuration in which the first feature of the thin-walled structure remains spatially located relative to the second feature of the thin-walled structure in the predetermined manner.

In other embodiments of the disclosure, a method of machining is disclosed as comprising providing a thin-walled structure in a first unconstrained configuration, constraining the thin-walled structure to a first constrained configuration that is different from the first unconstrained configuration, thereby providing a first spatial registration between a first feature of the thin-walled structure and a second feature of the thin-walled structure, and thereby providing a first spatial registration between the thin-walled structure and a datum of a tool as a function of the first spatial registration between the first feature and the second feature, and operating the tool to machine the thin-walled structure to a second constrained configuration while maintaining the first spatial registration between the first feature and the second feature.

In yet other embodiments of the disclosure, a method of manipulating a structure is disclosed as comprising providing a thin-walled structure in a first unconstrained configuration, the thin-walled structure comprising a plurality of open volumes accessible from outside of the thin-walled structure, and constraining the thin-walled structure to a first constrained configuration by inserting a constrainer into at least one of the plurality of open volumes in a first state and changing the constrainer from the first state to a second state.

BRIEF DESCRIPTION OF THE DRAWINGS

For a more complete understanding of the present disclosure and the advantages thereof, reference is now made to the following brief description, taken in connection with the accompanying drawings and detailed description.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In some cases, it may be desirable to provide systems and methods of machining a thin-walled structure, such as a honeycomb structure, without requiring the application of temporary skins to the thin-walled structure and/or without requiring special purpose tools complementary to a machined profile of the thin-walled structure. In come embodiments, the thin-walled structure may comprise walls comprising a thickness of about 0.05 mm to about 5 mm, about 0.1 mm to about 2 mm, about 0.5 mm to about 1 mm. In some embodiments, a thin-walled structure may comprise an expanded structure that comprises disproportionately greater strength in compression in a direction parallel to a height of the structure as compared to the compression strength of the expanded structure in each of a lateral and longitudinal direction. In some cases, the compression strength of the expanded structure in the direction parallel to the height may be at least one order of magnitude greater than the compression strength of the expanded structure in each of a lateral and longitudinal direction.

Figure 1:
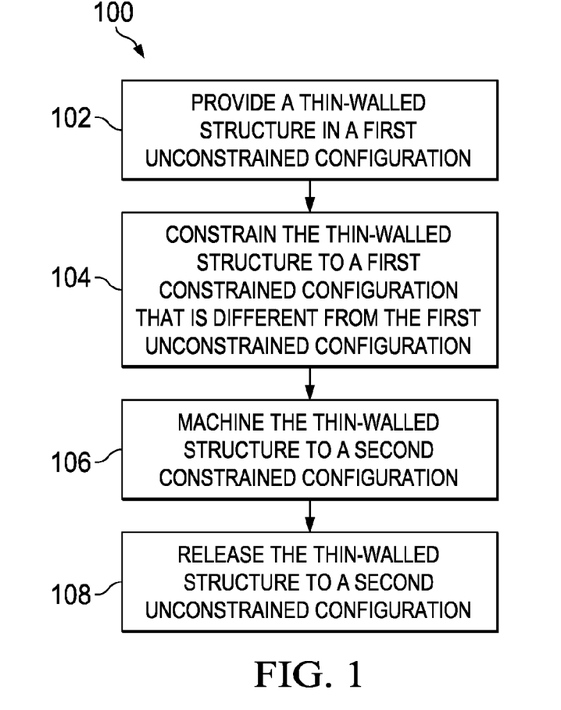
FIG. 1 is a flowchart of a method of machining a thin-walled structure according to an embodiment of the disclosure.

Referring now to FIG. 1, a flowchart of a method 100 of machining a thin-walled structure is shown. In some embodiments of the disclosure, the method 100 may provide for constraining the thin-walled structure in a predetermined constrained configuration during machining without the need for applying a skin to the thin-walled structure.

The method 100 may begin at block 102 by providing a thin-walled structure in a first unconstrained configuration. In some cases, the first unconstrained configuration may be a configuration in which the thin-walled structure tends to configure itself to a lowest energy state, such as a relaxed or uncompressed state. For example, the lowest energy state of a thin-walled honeycomb type core structure may be a configuration in which the hexagon shaped cell structures are not fully symmetrical about the central axes of the cells. The method 100 may progress to block 104 where the thin-walled structure may be constrained to a first constrained configuration that is different than the first unconstrained configuration. In some cases, the thin-walled structure may be laterally or longitudinally stretched or compressed to change the thin-walled structure from the first unconstrained configuration to the first constrained configuration. In some embodiments, the thin-walled structure may be stretched or compressed along any other suitable in-plane direction selected to expand or contract the thin-walled structure without accomplishing such expansion and/or contraction via separation of adjacent cell walls and/or major buckling of cell walls. In some embodiments, a thin-walled structure may comprise 2 or more such in-plane directions in which non-destructive expansion and/or contraction may be accomplished. In some embodiments, a predetermined open cell void shape may be maintained while the thin-walled structure is constrained in the first constrained configuration.

In some cases, the thin-walled structure may comprise a known Poisson ratio so that a substantially known change in a lateral width may result in a resultant and substantially known change in longitudinal length and vice versa. In some cases, the thin-walled structure may comprise a positive Poisson ratio so that expansion of the thin-walled structure along a first axis results in contraction in a second axis that is generally orthogonal to the first axis. In other cases, the thin-walled structure may comprise a negative Poisson ratio so that expansion of the thin-walled structure along a first axis results in expansion in a second axis that is generally orthogonal to the first axis. In still other cases, gross expansion and/or contraction of the thin-walled structure may not yield substantially predictable changes, may result in non-linear resultant changes, and/or the resultant changes may be unique to the thin-walled structure.

In some cases and to the extent that a Poisson type ratio and/or behavior is known for the thin-walled structure, achieving the first constrained configuration may comprise spatially locating a first feature of the thin-walled structure relative to a second feature of the thin-walled structure in a predetermined manner. For example, where the thin-walled structure comprises a honeycomb structure comprising a composite web of woven carbon fiber material and where the honeycomb structure comprises relatively large cell size, a predetermined configuration may be obtained by locating a second feature of the thin-walled structure a predetermined distance from the first feature. In some embodiments, the relatively large cell size may comprise a range of at least about 0.25 inches to 15 inches, about 0.4 inches to about 5 inches, or about 0.5 inches to about 1.5 inches. In some cases, a cell of the honeycomb structure may assume a predetermined and/or preferred shape, such as, but not limited to, a symmetric hexagon, as a result of locating the second feature a predetermined distance from the first feature. Regardless of any inherent geometrically predictable response behavior of the thin-walled structure to gross expansion and/or contraction, the thin-walled structure may be caused to assume the first constrained configuration, even if by providing complex and/or specialized tools for manipulating the thin-walled structure. As will be discussed below, a restrainer system may be utilized to selectively keep the thin-walled structure in the first constrained configuration, in some cases, without the assistance of systems utilized to change the thin-walled structure from the first unconstrained configuration to the first constrained configuration.

The method 100 may continue to block 106 where the thin-walled structure may be machined. In some embodiments, the machining may comprise a router, a Gerber cutter, a plasma cutter, a rotary bit, a water jet cutter, a laser cutter, and/or any other suitable device. In some cases where the thin-walled structure comprises a relatively high material hardness, relatively high structural stiffness, relatively low vibration damping characteristic, and/or one or more natural frequencies or harmonics thereof that may tend to allow vibrational excitement of at least a portion of the thin-walled structure while machining, it may be desirable to maintain the thin-walled structure in the first constrained configuration utilizing a restraining system configured to reduce undesirable fracture of the thin-walled structure and/or vibration of the thin walled structure. In some cases, a restraining system may be configured to both hold the thin-walled structure in the first constrained configuration while also improving machinability of the thin-walled structure. In some cases, the restraining system may be configured to improve or at least not decrease a capability of the thin-walled structure to mechanically and/or chemically bond with add-on components and/or adhesive agents, respectively.

In some cases, the method 100 may progress to block 108 where the thin-walled structure is at least partially release from the first constrained configuration and allowed to assume a second unconstrained constrained configuration. In some embodiments, the second unconstrained configuration may be substantially the same as the second constrained configuration. For example, the second unconstrained configuration may be substantially the same as the second constrained configuration when the above-described machining removes material of the thin-walled structure in a manner that causes the second constrained configuration to be a relatively low energy state of the thin-walled structure. Alternatively, the second unconstrained configuration may cause the thin-walled structure to exhibit geometric behavior and/or a low energy state that is significantly different than one or more of the first unconstrained configuration, the first constrained configuration, and the second constrained configuration. In some cases, the thin-walled structure may subsequently be utilized in a composite structure with the thin-walled structure in the second unconstrained configuration, the second constrained configuration, or any other configuration.

With the thin-walled structure in the predetermined configuration, one or more of the machining systems disclosed herein may be utilized to constrain the thin-walled structure during machining of the thin-walled structure. In some embodiments, the machining systems comprise cetyl alcohol, ferrous and/or magnetic material, and/or bottle brushes configured to be received within one or more open volumes or cells of the thin-walled structure. In some embodiments, the above-described system components for constraining the thin-walled structure may be easily removed from the thin-walled structure after machining without having damaged the thin-walled structure and/or otherwise compromised an ability of the thin-walled structure to undergo any subsequent adhesive bonding.

Figure 2A:
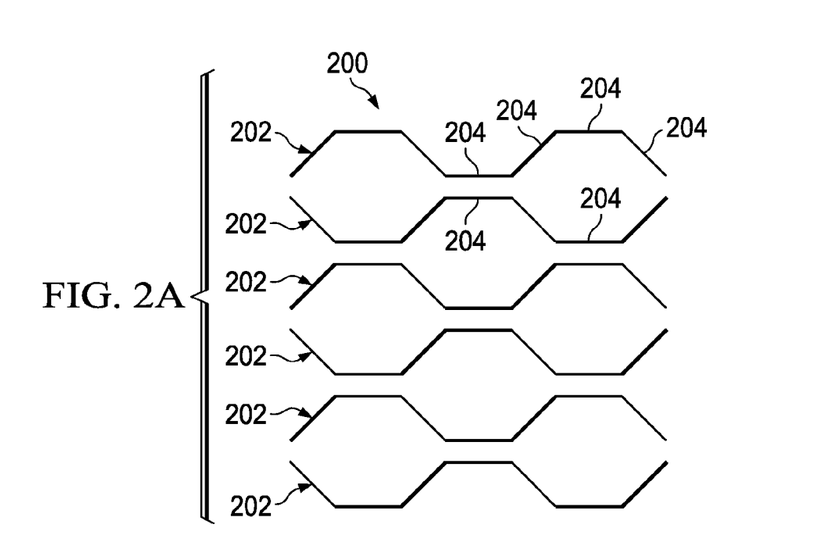
FIGS. 2A-2C are orthogonal top views of a thin-walled structure according to an embodiment of the disclosure in an unassembled configuration, a first unconstrained configuration, and a first constrained configuration, respectively.
Figure 2B:
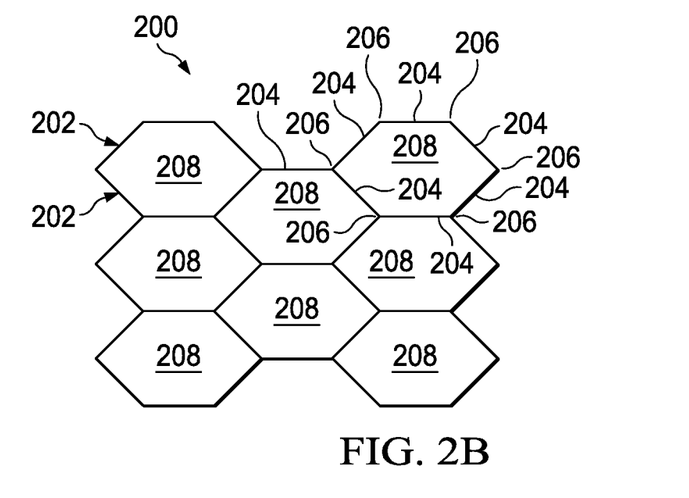
Figure 2C:
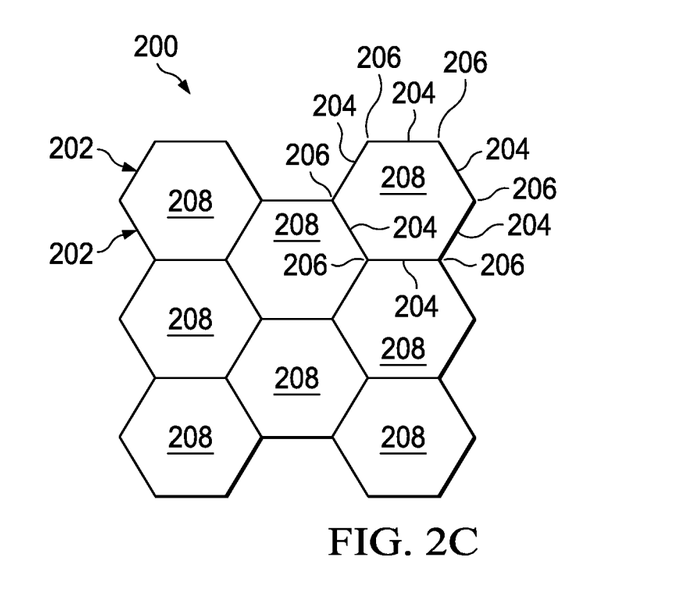

Referring now to FIGS. 2A-2C orthogonal top views of a thin-walled structure 200 comprising a positive Poisson ratio is shown. FIG. 2A shows the thin-walled structure 200 prior to being fully assembled. FIG. 2B shows the thin-walled structure 200 in a first unconstrained configuration as discussed above with regard to block 102. FIG. 2C shows the thin-walled structure 200 in a first constrained configuration as discussed above with regard to block 104. In this embodiment, the thin-walled structure 200 comprises a plurality of ribbons 202 comprising walls 204 bounded by bends of the ribbons 202. In this embodiment, each ribbon 202 comprises a continuously woven carbon fiber material. Comparing FIGS. 2A and 2B, it can be seen that the thin-walled structure 200 may be formed by adhering walls 204 of adjacent ribbons 202 so that nodes 206 may generally demark leg endpoints of partial and/or full hexagonal open volume cells 208. Comparing FIGS. 2B and 2C, it can be seen that a gross expansion of the thin-walled structure 200 along a first axis (up-down or longitudinal in FIGS. 2B and 2C) results in a gross contraction along a second axis (left-right or lateral in FIGS. 2B and 2C) that is orthogonal to the first axis. Because the geometric behavior of the thin-walled structure 200 is substantially predictable, two of any of the ribbons 202, walls 204, nodes 206, and cells 208 may serve as the first feature and second feature of the above-described method 100.

Figure 3A:
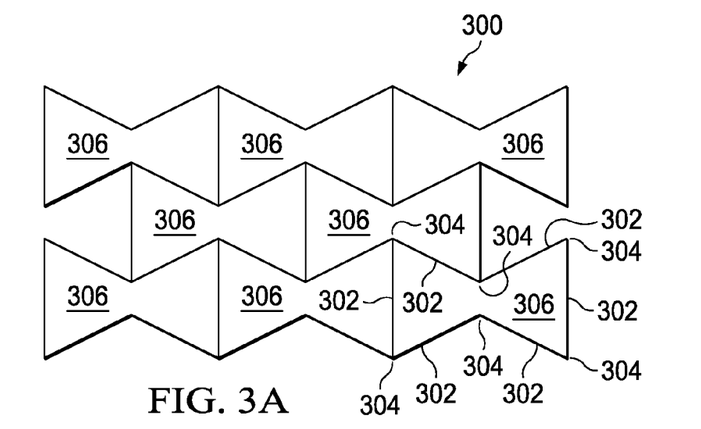
FIGS. 3A-3B are orthogonal top views of a thin-walled structure according to another embodiment of the disclosure in a first unconstrained configuration and a first constrained configuration, respectively.
Figure 3B:
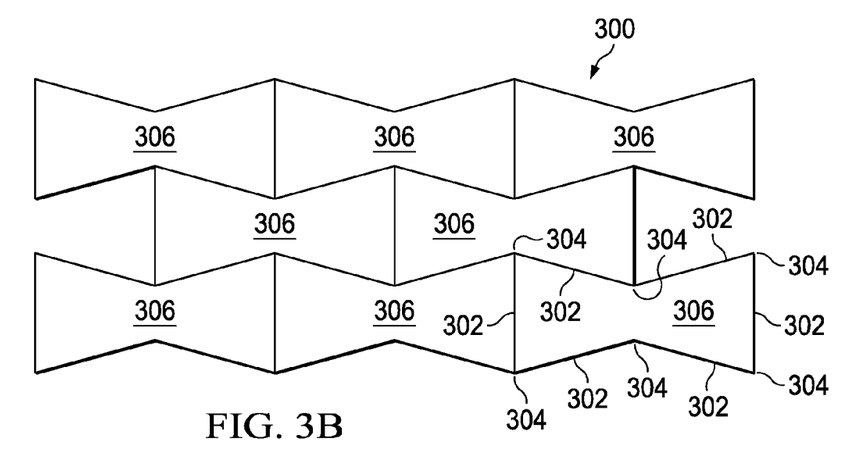

Referring now to FIGS. 3A and 3B orthogonal top views of a thin-walled structure 300 comprising a negative Poisson ratio is shown. FIG. 3A shows the thin-walled structure 300 in a first unconstrained configuration as discussed above with regard to block 102. FIG. 3B shows the thin-walled structure 300 in a first constrained configuration as discussed above with regard to block 104. In this embodiment, the thin-walled structure 300 comprises walls 302 that connect at nodes 304. The nodes 304 may generally demark leg endpoints of partial and/or full bow-tie shaped open volume cells 306. Comparing FIGS. 3A and 3B, it can be seen that a gross expansion of the thin-walled structure 300 along a first axis (left-right or lateral in FIGS. 3A and 3B) results in a gross expansion along a second axis (up-down or longitudinal in FIGS. 3A and 3B) that is orthogonal to the first axis. Because the geometric behavior of the thin-walled structure 300 is substantially predictable, two of any of the walls 302, nodes 304, and cells 306 may serve as the first feature and second feature of the above-described method 100.

Figure 4A:
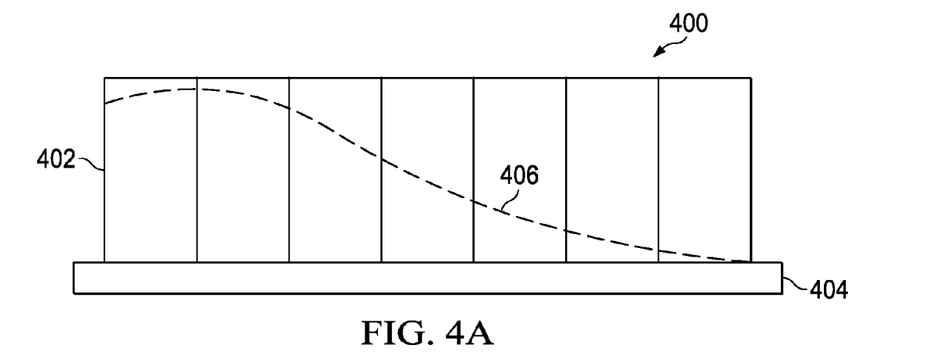
FIGS. 4A-4D are schematic orthogonal side views showing various stages of use of a restrainer system according to an embodiment of the disclosure.
Figure 4B:
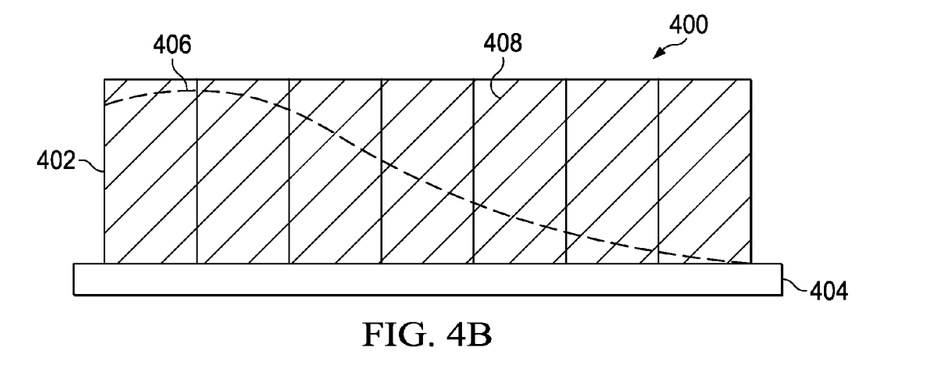
Figure 4C:
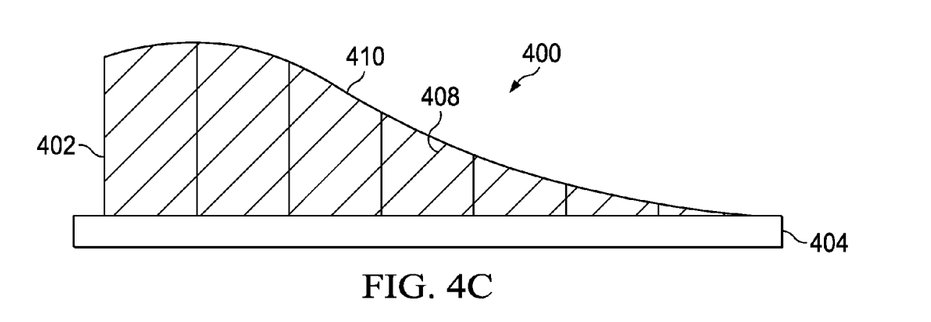
Figure 4D:
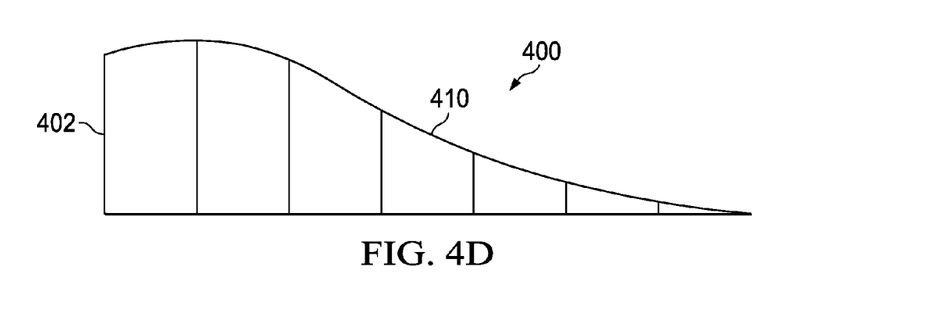

Referring now to FIGS. 4A-4D, a restrainer system 400 configured for selectively restraining a thin-walled structure 402 is shown in various stages of use. Referring to FIG. 4A, the thin-walled structure 402 is shown resting on a tool 404 of the restrainer system 400 that may be configured as a substantially planar table. For purposes of explaining the restrainer system 400, a visual representation of a machining profile 406 is shown. In some embodiments, the thin-walled structure 402 may comprise a thin-walled structure substantially similar to thin-walled structure 200 that is described above. The restrainer system 400 may be utilized by first locating the thin-walled structure 402 on the tool 404 as shown in FIG. 4A in the manner described at block 104. Next, a material such as liquid cetyl alcohol 408 may be poured into the cells of the thin-walled structure 402 as shown in FIG. 4B. Next, the cetyl alcohol 408 may be solidified sufficiently to restrain the thin-walled structure 402 in the first constrained configuration. Next, the thin-walled structure 402 may be machined to a second constrained configuration in which the thin-walled structure 402 comprises a machined profile 410 as shown in FIG. 4C and as described at block 106. In this embodiment, the devices used to machine the thin-walled structure 402 similarly machines through cetyl alcohol 408 during the machining. In some embodiments, the cetyl alcohol 408 not only restrains the thin-walled structure 402 but also serves to improve a machinability of the thin-walled structure 402 by improving structural support of the thin-walled structure 402, reducing undesirable vibrations transmitted through the thin-walled structure 402, and/or otherwise preventing undesirable breakage of the thin-walled structure 402 during the machining. Next, the cetyl alcohol 408 may be melted and removed from the open volumes of the cells of the thin-walled structure 402, the thin-walled structure 402 may be removed from the tool 404, and the thin-walled structure 402 may be allowed to assume the second unconstrained configuration shown in FIG. 4D and described at block 108.

Figure 5A:
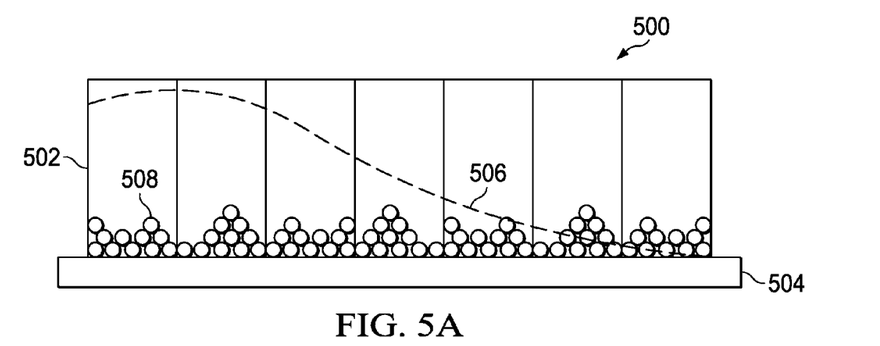
FIGS. 5A-5D are schematic orthogonal side views showing various stages of use of a restrainer system according to another embodiment of the disclosure.
Figure 5B:
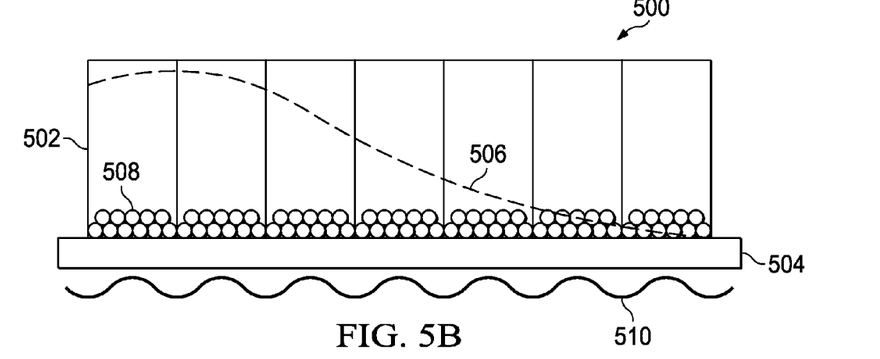
Figure 5C:
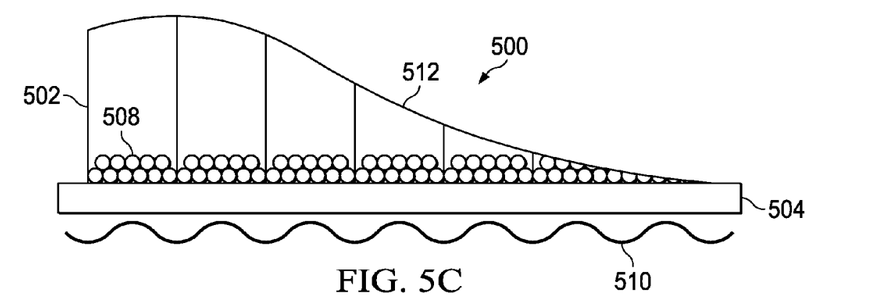
Figure 5D:
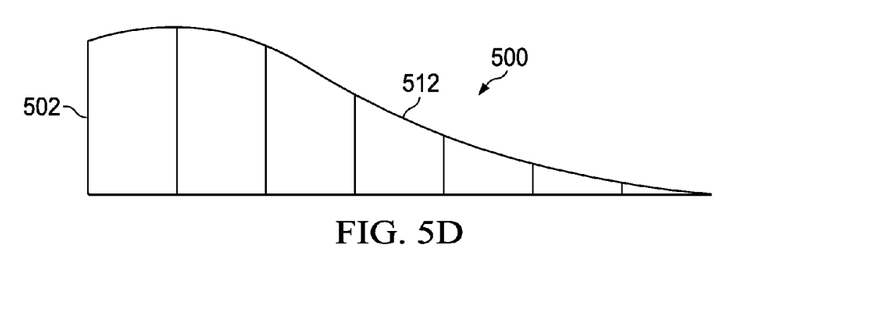

Referring now to FIGS. 5A-5D, a restrainer system 500 configured for selectively restraining a thin-walled structure 502 is shown in various stages of use. Referring to FIG. 5A, the thin-walled structure 502 is shown resting on a tool 504 of the restrainer system 500 that may be configured as a substantially planar table. For purposes of explaining the restrainer system 500, a visual representation of a machining profile 506 is shown. In some embodiments, the thin-walled structure 502 may comprise a thin-walled structure substantially similar to thin-walled structure 200 that is described above. The restrainer system 500 may be utilized by first locating the thin-walled structure 502 on the tool 504 as shown in FIG. 5A as described at block 104. Next, an aggregate ferrous and/or magnetic material such as ferrous balls 508 (e.g. lead shot) may be poured into the cells of the thin-walled structure 502 as shown in FIG. 5A. The ferrous balls 508 may generally form an uncompact, non-uniform, and/or relatively loosely packed layer of ferrous material within the cells of the thin-walled structure 502. Next, as shown in FIG. 5B, an electromagnetic field may be applied to the ferrous balls 508 from a magnet 510 so that the ferrous balls 508 may provide a more compact, a more uniform, and/or a more densely packed layer of ferrous material within the cells of the thin-walled structure 502. In some embodiments, the change in formation of the ferrous balls 508 may increase a force applied to the walls of the cells of the thin-walled structure 502 sufficient to restrain the thin-walled structure 502 in the first constrained configuration. Next, as described at block 106, the thin-walled structure 502 may be machined to a second constrained configuration in which the thin-walled structure 502 comprises a machined profile 512 as shown in FIG. 5C. In this embodiment, the devices used to machine the thin-walled structure 502 similarly machines through the ferrous balls 508 during the machining. In some embodiments, the ferrous balls 508 not only restrain the thin-walled structure 502 but also serve to improve a machinability of the thin-walled structure 502 by improving structural support of the thin-walled structure 502, reducing undesirable vibrations transmitted through the thin-walled structure 502, and/or otherwise preventing undesirable breakage of the thin-walled structure 502 during the machining. Next, the magnet 510 may be deactivated, the ferrous balls 508 may be removed from the open volumes of the cells of the thin-walled structure 502, the thin-walled structure 502 may be removed from the tool 504, and the thin-walled structure 502 may be allowed to assume the second unconstrained configuration shown in FIG. 5D and described at block 108. In some embodiments, the above-described ferrous balls may comprise an outer diameter substantially smaller than a cell dimension, such as, but not limited to, ferrous sand-like material, ferrous microbeads, and/or any other suitably shaped aggregate matter that may reorganize in response to exposure to a magnetic force.

Figure 6A:
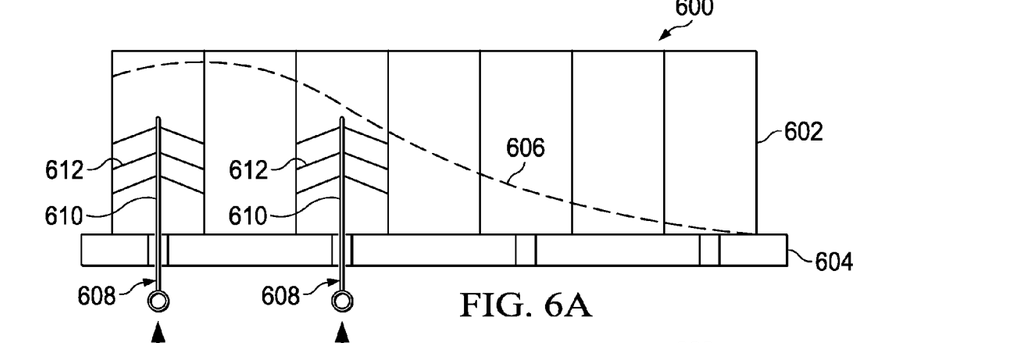
FIGS. 6A-6D are schematic orthogonal side views showing various stages of use of a restrainer system according to yet another embodiment of the disclosure.
Figure 6B:
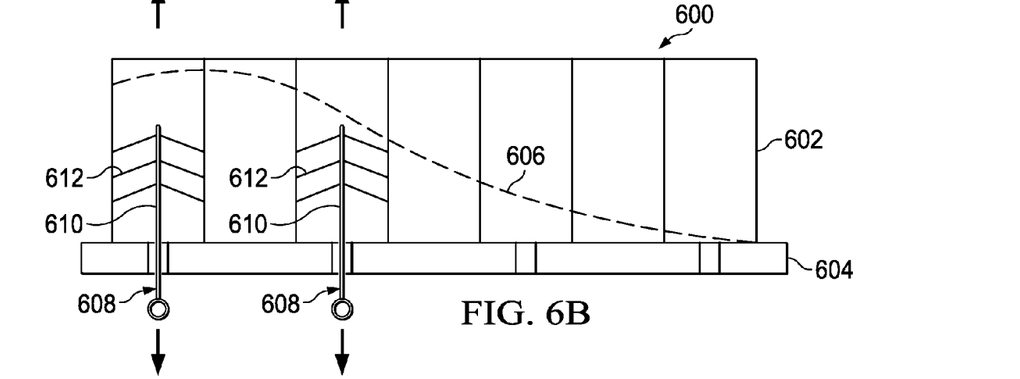
Figure 6C:
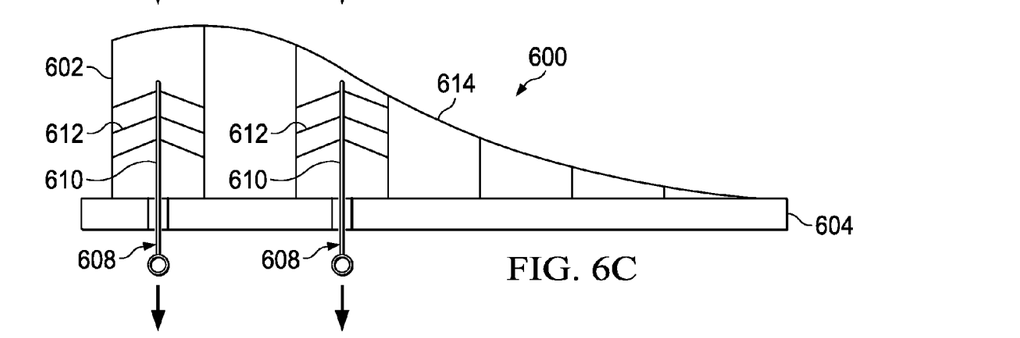
Figure 6D:
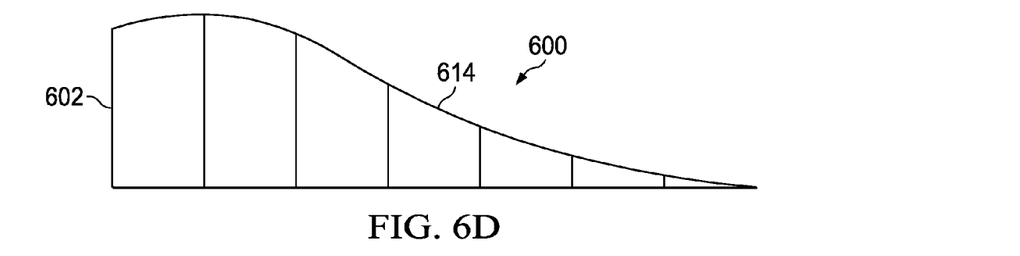

Referring now to FIGS. 6A-6D, a restrainer system 600 configured for selectively restraining a thin-walled structure 602 is shown in various stages of use. Referring to FIG. 6A, the thin-walled structure 602 is shown resting on a tool 604 of the restrainer system 600 that may be configured as a substantially planar table. For purposes of explaining the restrainer system 600, a visual representation of a machining profile 606 is shown. In some embodiments, the thin-walled structure 602 may comprise a thin-walled structure substantially similar to thin-walled structure 200 that is described above. The restrainer system 600 may be utilized by first locating the thin-walled structure 602 on the tool 604 as shown in FIG. 6A as described at block 104. Next, bottle brushes 608 may be inserted into the cells of the thin-walled structure 602 through holes in tool 604 as shown in FIG. 6A. While bottle brushes 608 may be utilized in this embodiment, any other suitable device comprising a plurality of flexible elements (e.g. bristles) configured for selective engagement against a wall of a cell may be used. The bottle brushes 608 may generally comprise stems 610 and bristles 612 extending from the stems 610. Upon insertion of the bottle brushes 608 into the cells of the thin-walled structure 602, the bristles 612 may be in a first orientation relative to the walls of the cells of the thin-walled structure 602. Next, as shown in FIG. 6B, a downward force may be applied to the bottle brushes 608 to contact the bristles 612 against the walls of the cells of the thin-walled structure 602 with greater force and thereby increasing a force with which the thin-walled structure 602 is abutted against the tool 604. The application of the downward force to the bottle brushes 608 may be sufficient to restrain the thin-walled structure 602 in the first constrained configuration. Next, as described at block 106, the thin-walled structure 602 may be machined to a second constrained configuration in which the thin-walled structure 602 comprises a machining profile 614 as shown in FIG. 6C. In this embodiment, the bottle brushes 608 may be located below the machining profile 614 so that the devices used to machine the thin-walled structure 602 do not contact the bottle brushes 608 during the machining. In some embodiments, the bottle brushes 608 not only restrain the thin-walled structure 602 but also serve to improve a machinability of the thin-walled structure 602 by improving structural support of the thin-walled structure 602, reducing undesirable vibrations transmitted through the thin-walled structure 602, and/or otherwise preventing undesirable breakage of the thin-walled structure 602 during the machining. Next, the bottle brushes 608 may be removed from the open volumes of the cells of the thin-walled structure 602, the thin-walled structure 602 may be removed from the tool 604, and the thin-walled structure 602 may be allowed to assume the second unconstrained configuration shown in FIG. 6D as described at block 108.

In some embodiments, a bottle brush may comprise a bristle directionality configured to relatively forcefully lock against the walls of the cells so that prior to removing the bottle brush from the cells by simply translating the bottle brush in a direction opposite to the direction of insertion, a twisting of the bottle brushes may be required to unlock the bottle brush from the cell. In some cases, the bottle brush may be twisted until the angle of the bristle in the radial direction (i.e. wrap direction) exceeds the angle of the bristle in the axial direction of the bottle brush. In other embodiments, the bottle brushes may be selectively removable from the tool or table so that the bottle brushes may be removed from the cells by passing the bottle brushes through the cells in the original direction of insertion. In some embodiments, the bottle brushes may be sacrificial in that they may be machined away during machining of the thin-walled structure. In alternative embodiments, the bottle brushes may initially extend beyond the machined profile and be selectively removed and/or lowered below the machining profile prior to the bottle brush being contacted by a machining tool.

Figure 7A:
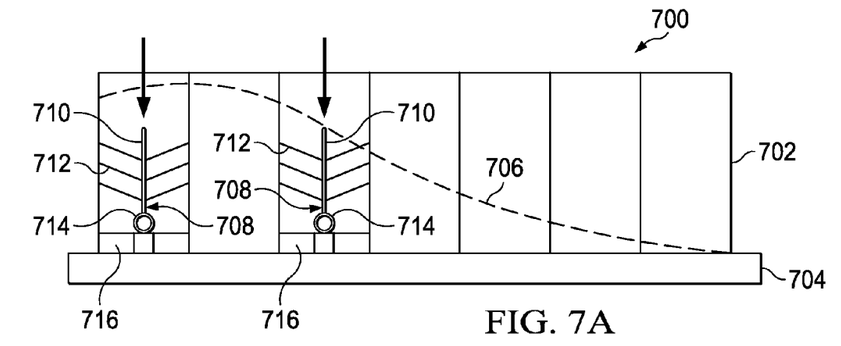
FIGS. 7A-7D are schematic orthogonal side views showing various stages of use of a restrainer system according to still another embodiment of the disclosure.
Figure 7B:
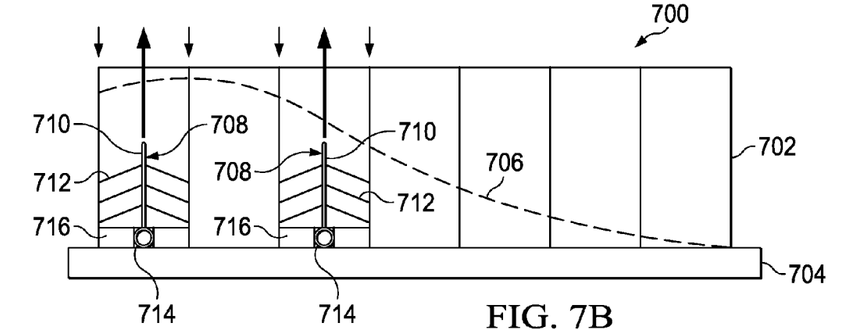
Figure 7C:
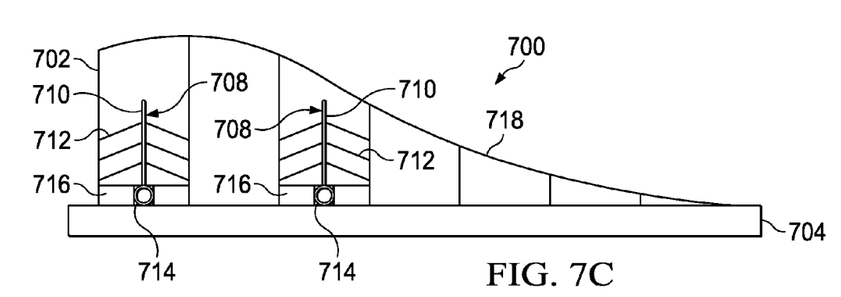
Figure 7D:
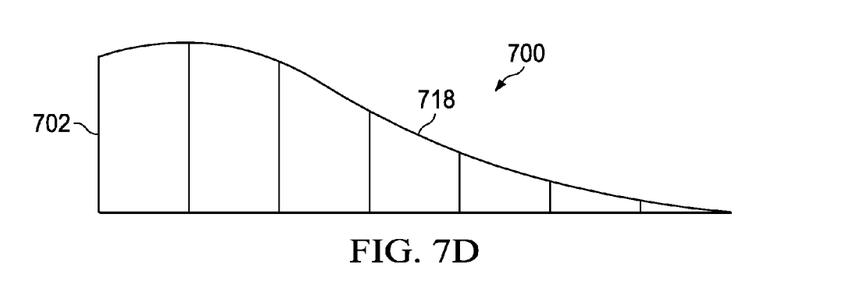

Referring now to FIGS. 7A-7D, a restrainer system 700 configured for selectively restraining a thin-walled structure 702 is shown in various stages of use. Referring to FIG. 7A, the thin-walled structure 702 is shown resting on a tool 704 of the restrainer system 700 that may be configured as a substantially planar table. For purposes of explaining the restrainer system 700, a visual representation of a machining profile 706 is shown. In some embodiments, the thin-walled structure 702 may comprise a thin-walled structure substantially similar to thin-walled structure 200 that is described above. The restrainer system 700 may be utilized by first locating the thin-walled structure 702 on the tool 704 as shown in FIG. 7A. Next, bottle brushes 708 may inserted into the cells of the thin-walled structure 702 from above as shown in FIG. 7A as described at block 104. The bottle brushes 708 may generally comprise stems 710 and bristles 712 extending from the stems 710. Upon insertion of the bottle brushes 708 into the cells of the thin-walled structure 702, the bristles 712 may be in a first orientation relative to the walls of the cells of the thin-walled structure 702. Next, as shown in FIG. 7B, fastener components 714 of the bottle brushes 708 may engage complementary fastener components 716 that are generally anchored and/or tethered to the tool 704. After selectively joining the fastener components 714, 716, the thin-walled structure 702 may be held against the tool 704 while pulling the bottle brushes 708 away from the tool 704, in some embodiments, thereby moving the bristles 712 into a second orientation relative to the walls of the cells of the thin-walled structure 702. In some embodiments, the second orientation may be relatively better than the first orientation at transferring a downward force to the walls of the cells of the thin-walled structure 702. In some embodiments, slack and/or flexibility of the bottle brushes 708 and/or the fastener components 716 may allow preloading the bottle brushes 708 with a downward force that is transferred to the thin-walled structure 702 via the bristles 712. In some embodiments, the preloading may increase a force with which the thin-walled structure 702 is abutted against the tool 704 in a manner sufficient to restrain the thin-walled structure 702 in the first constrained configuration. Next, as described at block 106, the thin-walled structure 702 may be machined to a second constrained configuration in which the thin-walled structure 702 comprises a machined profile 718 as shown in FIG. 7C. In this embodiment, the bottle brushes 708 are located below the machining profile 718 so that the devices used to machine the thin-walled structure 702 do not contact the bottle brushes 708 during the machining. In some embodiments, the bottle brushes 708 not only restrain the thin-walled structure 702 but also serve to improve a machinability of the thin-walled structure 702 by improving structural support of the thin-walled structure 702, reducing undesirable vibrations transmitted through the thin-walled structure 702, and/or otherwise preventing undesirable breakage of the thin-walled structure 702 during the machining. Next, the bottle brushes 708 may be disconnected from the fastener components 716 and removed from the open volumes of the cells of the thin-walled structure 702. Next the thin-walled structure 702 may be removed from the tool 704, and the thin-walled structure 702 may be allowed to assume the second unconstrained configuration shown in FIG. 7D. In alternative embodiments, the fastener components 716 may be magnetically held to the tool 704 and/or the fastener components 716 may be sized to fit snugly within the cells to further reduce movement of the thin-walled structure 702 relative to the tool 704. In other alternative embodiments, the fastener components 716 may comprise one or more leafs or leaf springs configured to engage the cell walls.

Figure 8A:
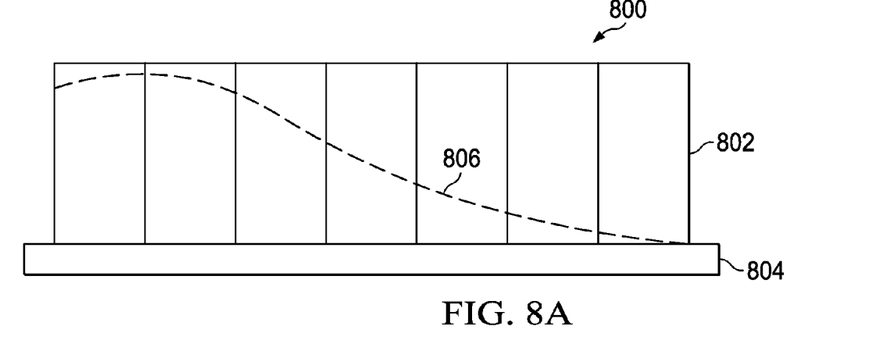
FIGS. 8A-8D are schematic orthogonal side views showing various stages of use of a restrainer system according to still another embodiment of the disclosure.
Figure 8B:
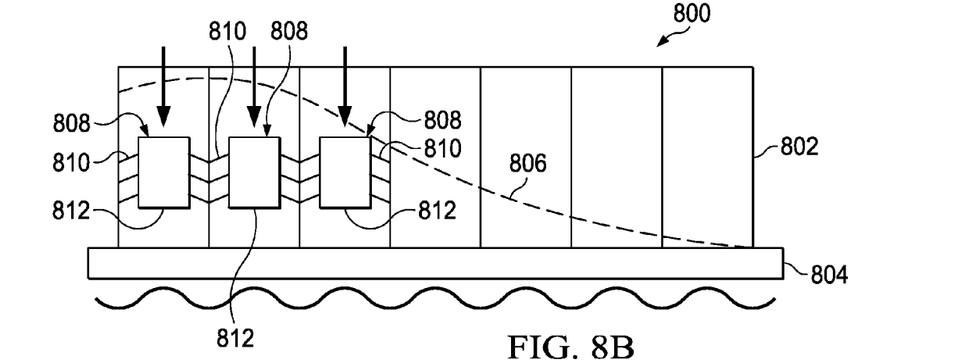
Figure 8C:
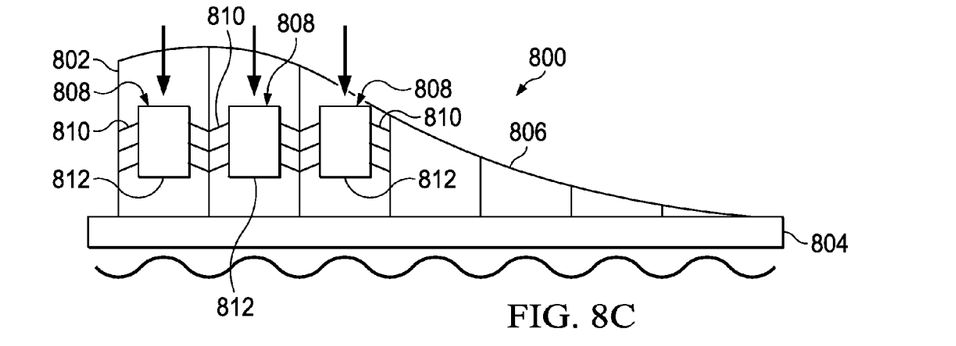
Figure 8D:
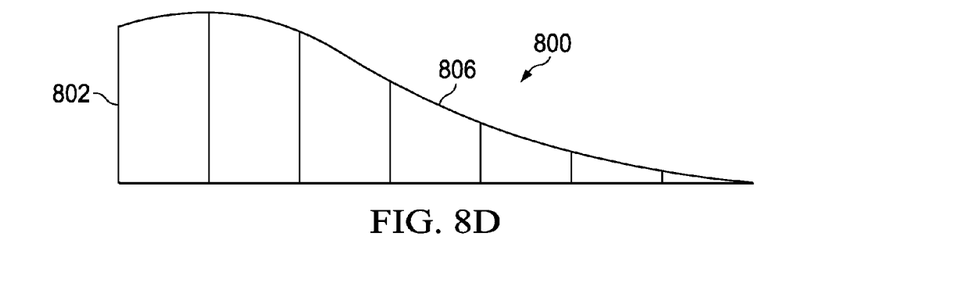

Referring now to FIGS. 8A-8D, a restrainer system 800 configured for selectively restraining a thin-walled structure 802 is shown in various stages of use. Referring to FIG. 8A, the thin-walled structure 802 is shown resting on a tool 804 of the restrainer system 800 that may be configured as a selectively magnetizable planar table or a magnetic chuck. For purposes of explaining the restrainer system 800, a visual representation of a machining profile 806 is shown. In some embodiments, the thin-walled structure 802 may comprise a thin-walled structure substantially similar to thin-walled structure 200 that is described above. The restrainer system 800 may be utilized by first locating the thin-walled structure 802 on the tool 804 as shown in FIG. 8A as described at block 104. Next, ferrous plugs 808 comprising bristles 810 may be inserted into the cells. The bristles 810 may be adhered to the plugs 808, partially embedded within the plugs 808, and/or maintained relative to the plugs 808 in any other suitable manner. The plugs 808 may comprise both ferrous components and non-ferrous components. The ferrous plugs 808 may comprise a base 812 and the bases 812 may be inserted into the cells beyond the outer extents of the cell so that when the cells are abutted against the tool 804 the bases 812 do not contact the tool 804. As shown, in some embodiments that plugs 808 may comprise an outer profile complementary to the cells and/or the bristles 810 may collectively comprise an outer profile that is complementary to the cell shape. Upon insertion of the plugs 808 into the cells of the thin-walled structure 802, the bristles 810 may be in a first orientation relative to the walls of the cells of the thin-walled structure 802. Next, as shown in FIG. 8B, the tool 804 may be energized to generate an electromagnetic force that acts on the ferrous plugs 808 to provide a downward force on the plugs 808. The downward force may be transferred from the plugs 808 to the walls of the cells via the bristles 810. The application of the downward force to the plugs 808 may be sufficient to restrain the thin-walled structure 802 in the first constrained configuration in which the thin-walled structure 802 is forcibly restrained against the tool 804 and wherein the cells maintain a desired, conventional, predetermined, and/or otherwise known shape. Next, as described at block 106, the thin-walled structure 802 may be machined to a second constrained configuration in which the thin-walled structure 802 comprises a machining profile 814 as shown in FIG. 8C. In this embodiment, the plugs 808 may be located below the machining profile 814 so that the devices used to machine the thin-walled structure 802 do not contact the plugs 808 during the machining. In some embodiments, the plugs 808 not only restrain the thin-walled structure 802 but also serve to improve a machinability of the thin-walled structure 802 by improving structural support of the thin-walled structure 802, reducing undesirable vibrations transmitted through the thin-walled structure 802, and/or otherwise preventing undesirable breakage of the thin-walled structure 802 during the machining. Next, the tool 804 may be de-energized, thereby discontinuing the application of force to the plugs 808. Next, the plugs 808 may be removed from the open volumes of the cells of the thin-walled structure 802, the thin-walled structure 802 may be removed from the tool 804, and the thin-walled structure 802 may be allowed to assume the second unconstrained configuration shown in FIG. 8D as described at block 108.

It will be appreciated that one or more of the components of the restrainer systems 400, 500, 600, 700, 800 may be referred to as constrainers because they may assist in constraining the thin-walled structures to constrained configurations. Further, in some embodiments, the above-described tools 404, 504, 604, 704, 804 may comprise one or more datums that the thin-walled structures may be spatially registered and/or located relative to in a predetermined and/or known manner. In some embodiments where a device that performs the machining is similarly registered and/or located relative to the one or more datums, the thin-walled structure may be accurately machined as a function of both the device and the thin-walled structure having known spatial relationships relative to the one or more datums. In some embodiments, the constraining of a first feature of a thin-walled structure to have a particular spatial location relative to a second feature of the thin-walled structure may be referred to maintaining a spatial registration between the first feature and the second feature. In some embodiments, a thin-walled structure may need to be machined to have multiple machining profiles that each require moving the thin-walled structure relative to the machining device and/or the supporting tool. In such cases, the thin-walled structure may be repeatedly spatially registered relative to one or more of the datums. It will be appreciated that to the extent that a thin-walled structure lacks repetitive geometry and/or predictable geometric behavior, arbitrary first and second features may be assigned so that the arbitrary first and second features may be used to selectively constrain the thin-walled structure to desired constrained configurations and/or to selectively spatially register the thin-walled structure relative to one or more datums. In some embodiments, the above-described restrainer systems may be repetitively utilized to allow the machining of multiple machining profiles into a single thin-walled structure despite the need to reorient the thin-walled structure relative to the machining device more than once. In some embodiments, the reorienting of the thin-walled structure relative to the machining device may allow opposing sides of the thin-walled structure to be machined without the use of specialized tools or support surfaces complementary to an already machined side of a thin-walled structure.

In some embodiments, the thin-walled structure may be temporarily held by additional components to achieve and hold the thin-walled structure in a first constrained configuration while initiating the above-disclosed methods of restraining the thin-walled structure during machining, such as, but not limited to, vices, weights, robotic hands, human hands, and/or any other suitable device for In some embodiments, alternative materials may be utilized in addition and/or instead of the above-described cetyl alcohol, ferrous balls, and/or bottle brushes to selectively restrain a thin-walled structure. In some embodiments, one or more of a water soluble cellulose, a washout clay, ferrous filings, syntactic foam, and/or aerogel may be utilized. In some cases, a portion of an open volume of a cell may be filled by a volumetric spacer that allows for the use of less of one or more of the materials described above as being inserted into the cells of a thin-walled structure. In some embodiments, a compressible closed foam material may be provided into the cells to seal the open volumes of the cells and a vacuum pressure may be introduced between the foam plug and the tool surface to hold a thin-walled structure to the tool surface. Further, in some embodiments, more or fewer of the cells of a thin-walled structure may be provided one or more of the materials described above and particular cells may be filled with the materials more or less than described above. Still further, in some embodiments, one or more of the materials introduced into the thin-walled structure may further be removed through a chemical cleansing process. For example, in some embodiments, in addition to melting the cetyl alcohol to remove it from a thin-walled structure, the cetyl alcohol may be washed away using isopropyl alcohol. In some embodiments, a thin-walled structure that has first received cetyl alcohol and subsequently be cleaned using isopropyl alcohol may increase an adhesive absorption capability of the thin-walled structure.

Figure 9:
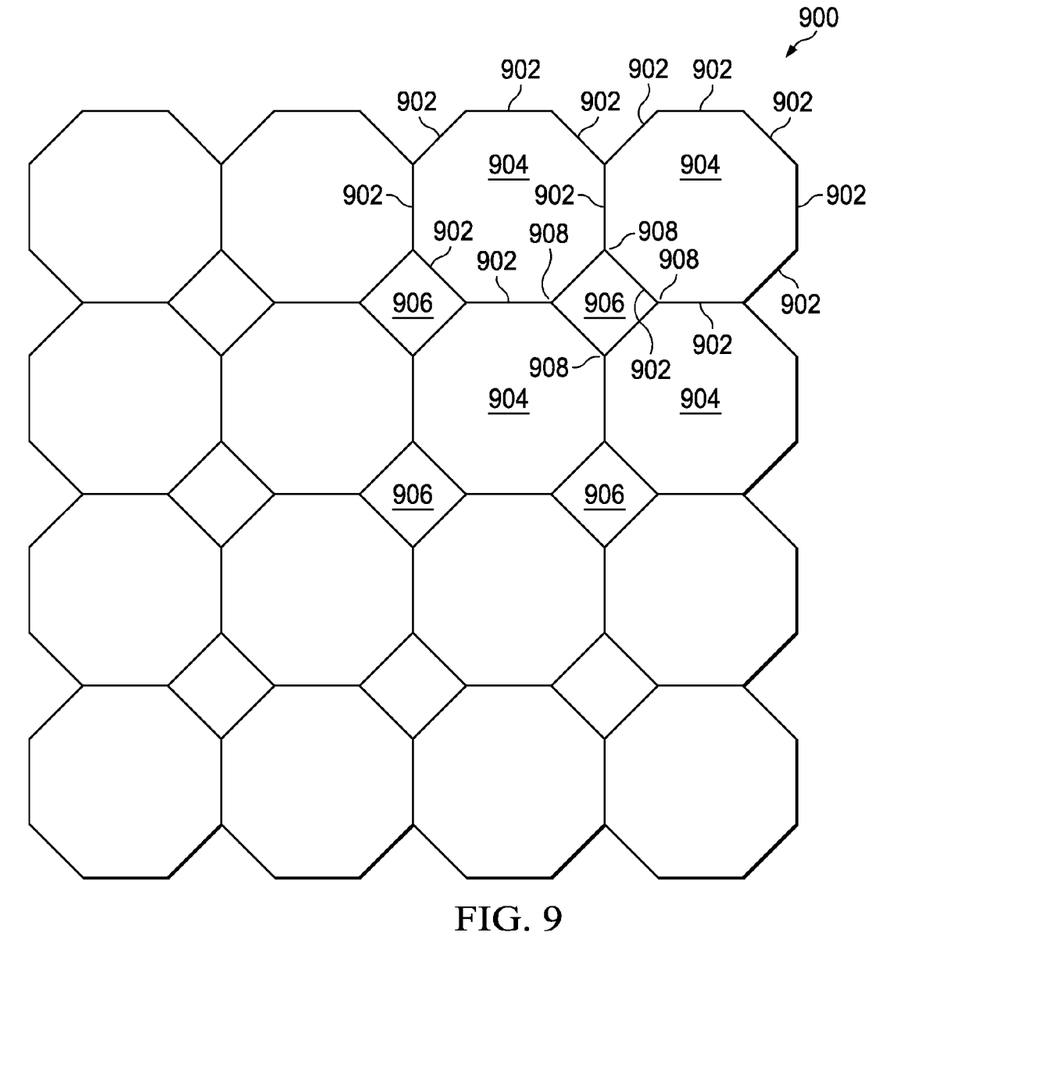
FIG. 9 is an orthogonal top view of a thin-walled structure according to another embodiment of the disclosure.

Referring now to FIG. 9, an orthogonal top view of a thin-walled structure 900. The thin-walled structure 900 generally comprises a plurality of cell walls 902 that define generally octagonal voids 904 and square voids 906. In some embodiments, the thin-walled structure 900 may be formed by braiding individual octagonal tubes and thereafter adhesively joining adjacent octagonal tubes to form the thin-walled structure 900. In some cases, in-plane compression of the thin-walled structure in some directions may yield some predictable translation of nodes 908 while in-plane compression of the thin-walled structure 900 in other direction may cause buckling of cell walls 902 and/or localized rotation of cell wall 902 material at nodes 908. The thin-walled structure 900 may be restrained by any one of the above-described restrainer systems 400, 500, 600, 700, 800 and may be restrained during machining according to method 100 and/or any other suitable machining method in which one or more open cell void shapes is maintained while the thin-walled structure 900 is machined.

It will be appreciated that one or more of the systems and methods described above may be used to generate engineered thin-walled structures for use in constructing rotor wings, airfoils or control surfaces, rotor blades, fuselage structures, space applications, fixed wing aircraft components, boat components, train components, bus components, wind generation system components, and/or any other suitable system or component that may utilized machined thin-walled structures. A composite rotor blade component may comprise a cured composite shell comprising a complex and/or non-linear concave surface and a thin-walled structure, such as, but not limited to, a honeycomb type core material. In some embodiments, the thin-walled structure of the composite rotor blade component may be manufactured as a substantially rectangular block of material. In some embodiments, the thin-walled structure may be retained and machined according to the method 100 so that the thin-walled structure comprises a machined profile complementary to the concave surface of the composite rotor blade component.

While thin-walled structures are generally described above as being relatively similar to a honeycomb structure, it will be appreciated that any other suitable thin-walled structure comprising open volumes accessible from outside of the thin-walled structure may be utilized. For example, a thin-walled structure comprising a plurality of bubble-like features joined together but with void space between the bubble-like features may be utilized using one or more of the systems and methods described above. More specifically, the open volumes between the bubble-like features may be selectively filled with cetyl alcohol and/or ferrous material so that the thin-walled structure may be selectively restrained in a constrained configuration.

In some embodiments, a thin-walled structure may generally be collapsible in response to compression in an in-plane direction that may be orthogonal or parallel with at least one cell wall of the thin-walled structure. In some honeycomb thin-walled structures, a number of different in-plane oriented directions of cell walls may exceed a number of possible directions in which in-plane compression may generally cause collapse of the thin-walled structure without primarily achieving the collapse via bending of the cell walls at locations other than locations local to nodes of the thin-walled structure. Accordingly, the above-described restraining may comprise restraining a thin-walled structure that is not already over-constrained (e.g., a hexagonal honeycomb thin-walled structure with three additional walls disposed in each hexagonal open cell void to divide the void into three triangles) in at least one of the possible directions of in-plane compression that may generally cause collapse of the thin-walled structure without substantially cell wall buckling.

In some embodiments, the above-described first constrained configuration and second constrained configuration may refer to configurations in which a thin-walled structure comprising a conventional cell shape, such as, but not limited to, a regular hexagon in which all sides are substantially the same length and in which all internal angles are substantially equal, is maintained. For example, a hexagon shaped thin-walled structure may be in a first constrained configuration prior to machining when one or more of the above-disclosed restrainer systems holds the thin-walled structure so that the cells are maintained in a regular hexagon shape. Similarly, the hexagon shaped thin-walled structure may be in a second constrained configuration after machining when one or more of the above-disclosed restrainer systems holds the thin-walled structure so that the cells are maintained in a regular hexagon shape during and/or after machining the thin-walled structure.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Unless otherwise stated, the term "about" shall mean plus or minus 10 percent of the subsequent value. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A method of manipulating a thin-walled structure, comprising:
providing a thin-walled structure in a first unconstrained configuration;
constraining the thin-walled structure to a first constrained configuration in which a first feature of the thin-walled structure is spatially located relative to a second feature of the thin-walled structure in a predetermined manner, wherein an open volume of the thin-walled structure is constrained to maintain a predetermined open volume shape; and
machining the thin-walled structure to a second constrained configuration in which the first feature of the thin-walled structure remains spatially located relative to the second feature of the thin-walled structure in the predetermined manner; and
wherein constraining the thin-walled structure to the first constrained configuration comprises providing a constrainer into the open volume of the thin-walled structure, the constrainer comprising at least partially solidified cetyl alcohol; and
wherein the constrainer further comprises at least one of a magnetic material and a ferrous material, and the constraining comprises selectively applying a magnetic force to the constrainer.

2. The method of claim 1, wherein the predetermined manner comprises locating the first feature and the second feature a predetermined distance from each other.

3. The method of claim 1, wherein constraining the thin-walled structure to a first constrained configuration comprises preventing movement of the thin-walled structure in at least one direction of in-plane compression that causes collapse of the thin-walled structure without substantial buckling of a cell wall of the thin-walled structure.

4. The method of claim 1, wherein at least one of the first feature and the second feature form a portion of a repeated geometric pattern of the thin-walled structure.

5. The method of claim 1, wherein the constraining the thin-walled structure to a first constrained configuration comprises locating the thin-walled structure in a predetermined spatial location relative to a datum of a tool configured to perform the machining.

6. The method of claim 1, wherein the thin-walled structure comprises at least one of (1) a predetermined relationship between lateral expansion and longitudinal compression and (2) a predetermined relationship between lateral compression and longitudinal extension.

7. The method of claim 1, wherein the thin-walled structure comprises a honeycomb core material comprising a carbon mesh material.

8. The method of claim 7, wherein the honeycomb core material comprises a cell size of about 0.5 inches.

9. The method of claim 1, wherein the open volume is accessible from outside of the thin-walled structure.

10. The method of claim 9, wherein the constrainer comprises a bottle brush.

11. The method of claim 1, wherein the machining is generally conducted along a path that is generally perpendicular to a central axis of a cell of the thin-walled structure.

12. The method of claim 1, wherein the thin-walled structure is a core material configured for use in a composite blade component and wherein the machining comprises contouring the thin-walled structure to complement a surface of a composite shell of the composite blade component.

13. The method of claim 1, further comprising washing away the cetyl alcohol using isopropyl alcohol.

14. A method of machining, comprising:
providing a thin-walled structure in a first unconstrained configuration;
constraining the thin-walled structure to a first constrained configuration that is different from the first unconstrained configuration, thereby providing a first spatial registration between a first feature of the thin-walled structure and a second feature of the thin-walled structure, and thereby providing a first spatial registration between the thin-walled structure and a datum of a tool as a function of the first spatial registration between the first feature and the second feature, wherein constraining the thin-walled structure to the first constrained configuration comprises providing a constrainer into an open volume of the thin-walled structure and selectively applying a magnetic force to the constrainer, the constrainer comprising at least partially solidified cetyl alcohol and at least one of a magnetic material and a ferrous material; and
operating the tool to machine the thin-walled structure to a second constrained configuration while maintaining the first spatial registration between the first feature and the second feature.

15. The method of claim 14, wherein the constraining locates the first feature and the second feature a predetermined distance from each other.

16. The method of claim 14, wherein the thin-walled structure comprises a compression strength in a direction parallel to a height of the thin-walled structure that is at least one order of magnitude greater than the compression strength of the thin-walled structure in a plurality of in-plane directions of the thin-walled structure.

17. The method of claim 14, wherein at least one of the first feature and the second feature form a portion of a repeated geometric pattern of the thin-walled structure.

18. The method of claim 14, wherein the machining is conducted along a path that is generally perpendicular to a central axis of a cell of the thin-walled structure.

19. The method of claim 14, wherein the open volume is accessible from outside of the thin-walled structure.

20. The method of claim 19, wherein the constrainer comprises a bottle brush.

21. The method of claim 14, further comprising providing a second spatial registration between the thin-walled structure and a datum of a tool as a function of the first spatial registration between the first feature and the second feature.

22. A method of manipulating a structure, comprising:
providing a thin-walled structure in a first unconstrained configuration, the thin-walled structure comprising a plurality of open volumes accessible from outside of the thin-walled structure; and
constraining the thin-walled structure to a first constrained configuration by inserting a constrainer into at least one of the plurality of open volumes in a first state and changing the constrainer from the first state to a second state, wherein the constrainer comprises at least partially solidified cetyl alcohol and at least one of a magnetic material and a ferrous material.

23. The method of claim 22, wherein the changing the constrainer from the first state to the second state comprises solidifying at least a portion of the constrainer.

24. The method of claim 22, wherein the changing the constrainer from the first state to the second state comprises increasing a packing density of the constrainer.

25. The method of claim 22, wherein the constrainer comprises a bottle brush.

26. The method of claim 22, wherein the changing the constrainer from the first state to the second state comprises applying a magnetic force to the constrainer.

* * * * *